(12) United States Patent
Lin et al.

(10) Patent No.: US 11,388,682 B2
(45) Date of Patent: Jul. 12, 2022

(54) DEVICE NOISE-BASED RECEIVED SIGNAL STRENGTH INDICATOR VALUE MODIFICATIONS

(71) Applicant: Hewlett-Packard Development Company, L.P., Spring, TX (US)

(72) Inventors: Chen-Fang Lin, Taipei (TW); Huai-Yung Yen, Taipei (TW); Ren-Hao Chen, Taipei (TW); Lo-Chun Tung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/046,019

(22) PCT Filed: Oct. 11, 2018

(86) PCT No.: PCT/US2018/055329
§ 371 (c)(1),
(2) Date: Oct. 8, 2020

(87) PCT Pub. No.: WO2020/076317
PCT Pub. Date: Apr. 16, 2020

(65) Prior Publication Data
US 2021/0360541 A1    Nov. 18, 2021

(51) Int. Cl.
*H04W 52/24*     (2009.01)
*H04L 1/00*      (2006.01)
*H04W 24/08*     (2009.01)
*H04W 84/12*     (2009.01)

(52) U.S. Cl.
CPC ....... *H04W 52/245* (2013.01); *H04L 1/0003* (2013.01); *H04L 1/0009* (2013.01); *H04W 24/08* (2013.01); *H04W 52/241* (2013.01); *H04W 84/12* (2013.01)

(58) Field of Classification Search
None
See application file for complete search history.

(56) References Cited

U.S. PATENT DOCUMENTS

| 5,857,155 A | 1/1999 | Hill et al. |
| 9,198,139 B2 | 11/2015 | Khaitan et al. |
| 9,491,722 B2 | 11/2016 | Yavuz et al. |

(Continued)

FOREIGN PATENT DOCUMENTS

| WO | WO-2011105945 A1 | 9/2011 | |
| WO | WO-2012088579 A1 * | 7/2012 | ......... H04W 52/241 |
| WO | WO-2013127699 A1 | 9/2013 | |

*Primary Examiner* — Hong Shao
(74) *Attorney, Agent, or Firm* — HPI Patent Department

(57) ABSTRACT

In one example, a device may include a transceiver to receive a signal at a first transmit power from an access point via a wireless network connection. The first transmit power may be based on a feedback received signal strength indicator (RSSI) value. Further, the device may include a noise detection unit to determine device noise generated in the device and a signal-to-noise ratio (SNR) monitoring unit to determine that an SNR value associated with the wireless network connection falls below a threshold due to the device noise. Furthermore, the device may include a control unit to modify the feedback RSSI value upon determining that the SNR value falls below the threshold and transmit the modified feedback RSSI value to the access point via the transceiver.

15 Claims, 5 Drawing Sheets

(56) References Cited

U.S. PATENT DOCUMENTS

| | | |
|---|---|---|
| 9,655,057 B2 | 5/2017 | Swartz et al. |
| 9,980,233 B2 | 5/2018 | Bharadwaj et al. |
| 2013/0176864 A1 | 7/2013 | Quan et al. |
| 2016/0037459 A1* | 2/2016 | Swartz .................. H04W 52/50 370/329 |
| 2016/0345270 A1 | 11/2016 | HomChaudhuri et al. |
| 2017/0135046 A1* | 5/2017 | Sutskover ........... H04W 52/343 |

* cited by examiner

DEVICE NOISE-BASED RECEIVED SIGNAL STRENGTH INDICATOR VALUE MODIFICATIONS

BACKGROUND

Wireless networks are becoming ubiquitous to provide access to resources and to facilitate communication between communication devices. Wireless networks operating in accordance with the Institute of Electrical and Electronics Engineers (IEEE) 802.11 a/b/g/n/ac/ax standards are examples of such networks. A wireless network, for example a wireless local area network (WLAN) or a Wi-Fi network, may include an access point that may communicate with devices such as mobile phones, notebooks, tablets, and so on. The access point may be coupled to a network, such as the Internet, and may enable the devices to communicate via the network and/or communicate with other devices coupled to the access point. For example, access points utilizing the 802.11 a/b/g/n/ac standard may service one user at a time while access points utilizing the 802.11 ax standard may service multiple users at a time.

BRIEF DESCRIPTION OF THE DRAWINGS

Examples are described in the following detailed description and in reference to the drawings, in which.

DETAILED DESCRIPTION

Figure 1:
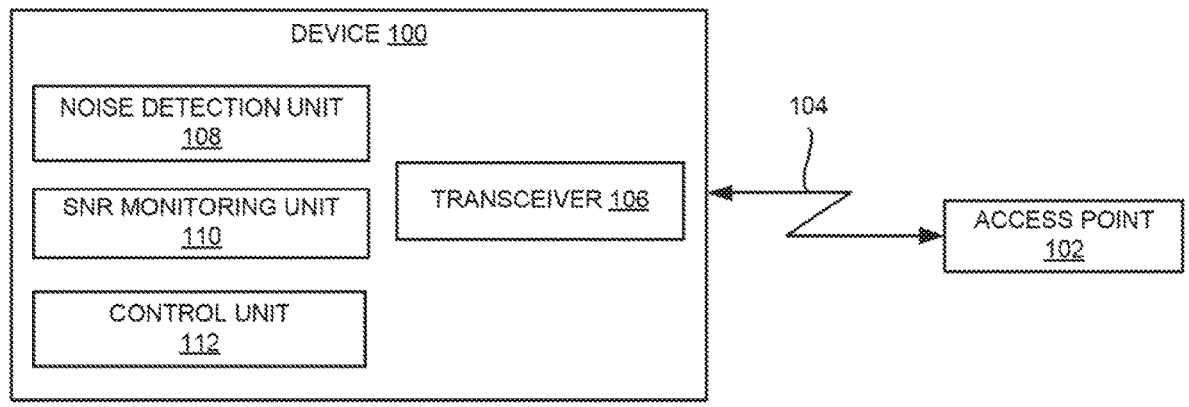
FIG. 1 is a block diagram of an example device, including a control unit to modify a feedback received signal strength indicator (RSSI) value based on device noise.

Devices such as laptop computers, tablet computers, personal digital assistants (PDAs), smartphones, and other wireless communication devices may communicate with each other or access resources via wireless networks. Wireless networks (e.g., a wireless local area network (WLAN), a Wi-Fi network, and the like) operating in accordance with Institute of Electrical and Electronics Engineers (IEEE) 802.11 a/b/g/n/ac/ax standards are examples of such networks. Further, a wireless network may include an access point that may enable the devices to communicate via a network and/or communicate with other devices coupled to the access point.

For example, the access point utilizing the 802.11 a/b/g/n/ac standard may service one device at a time. In this example, the access point may transmit the maximum power to the device. In contrast, access point utilizing the 802.11 ax standard may service multiple devices at a time. In this example, the access point may include smart antenna and individually control transmit powers for multiple devices at a time. For example, the access point may transmit different transmit powers to different devices based on feedback received signal strength indicator (RSSI) values received from the devices. An RSSI value may refer to an estimated measure of a power level that a device is receiving from the access point, such as a router. Further, the feedback RSSI value may depend on a distance between the device and the access point.

The Wi-Fi performance of the devices may be evaluated based on signal-to-noise ratio (SNR) values. An SNR value may refer to a ratio-based value that evaluates the signal based on device noise. In some examples, the access point may use received feedback RSSI values from the devices to judge a distance between the devices and the access point. When the access point receives a lower RSSI value, then the access point may determine that the distance between the device and the access point is increased and hence may transmit an increased power. Even though the distance between the device and the access point is not changed, the SNR value of the device may be reduced due to an increase in the device noise, which may impact the Wi-Fi performance of the device.

Examples described herein may determine device noise generated in a device (e.g., a wireless client device), for instance, using a modulation coding scheme (MCS) index value of a wireless network connection. Further, examples described herein may determine that an SNR value associated with the wireless network connection falls below a threshold due to the device noise, reduce the feedback RSSI value to maintain the SNR value greater than or equal to the threshold, and transmit the reduced feedback RSSI value to the access point so that the access point may transmit signal to the device at an enhanced transmit power. Thus, examples described herein may enhance the transmit power to maintain the similar SNR value when the device experiences noise, thereby optimizing the Wi-Fi performance of the device.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described may be included in at least that one example, but not necessarily in other examples.

Referring now to the figures, FIG. 1 is a block diagram of an example device 100, including a control unit 112 to modify a feedback RSSI value based on device noise. Device 100 may also be referred to as a wireless client, a station (STA), or a node. Example device 100 may be a laptop computer, a tablet computer, a personal digital assistant (PDA), a wireless watch, a paging device, a smartphone, or any other wireless communication device that may transmit and receive data using a wireless network connection (e.g., a WLAN, a Wi-Fi network, or the like). Example wireless network connection may be based on the IEEE 802.11 protocol such as IEEE 802.11ax or other wireless protocol. In some examples, device 100 may execute applications, such as web applications, remote server applications, and the like, which may have to communicate with other devices or servers using the wireless network connection. Further, the wireless network connection may include multiple access points that may enable device 100 to communicate via a network.

As shown in FIG. 1, device 100 may be communicatively connected to an access point 102 via a wireless network connection 104. In some examples, access point 102 may utilize IEEE 802.11 protocol to transmit and receive data. Example IEEE 802.11 protocol may be IEEE 802.11ax. The IEEE 802.11 protocol may use orthogonal frequency division multiple-access (OFDMA), time division multiple access (TDMA), or code division multiple access (CDMA). The IEEE 802.11 protocol may include a multiple access technique. For example, the IEEE 802.11 protocol may include a space-division multiple access (SOMA) or a multiple-user multiple-input multiple-output (MU-MIMO).

Further, device 100 may include a transceiver 106 to receive a signal at a first transmit power from access point 102 via wireless network connection 104. In one example, the first transmit power may be based on the feedback RSSI value. The feedback RSSI value may be a measure of a power level that device 100 is receiving from access point 102. For example, a lower feedback RSSI value may indicate a stronger signal received from access point 102. In some examples, transceiver 106 may include both a transmitter and a receiver that are combined. The transmitter may transmit the feedback RSSI value to access point 102 and the receiver may receive the signal from access point 102 based on the feedback RSSI value.

Furthermore device 100 may include a noise detection unit 108 to determine the device noise generated in device 100. For example, the device noise may be considered as noise, error, or undesired random disturbance of a useful information signal generated in device 100. For example, the device noise may be generated during plug-in of an external device (e.g., a universal serial bus (USB) 3.0/3.1 device) or an execution of an application (e.g., a higher loading gaming application). In one example, noise detection unit 108 may determine an increase in the device noise based on an MCS index value associated with wireless network connection 104. The MCS index value may refer to an index measuring a channel state associated with device 100 and access point 102. For example, the MCS index value may be a combination of a modulation scheme and coding rate associated with wireless network connection 104.

As shown in FIG. 1, device 100 may include an SNR monitoring unit 110 to determine that an SNR value associated with wireless network connection 104 falls below a threshold due to the device noise. The SNR value may refer to a ratio of a signal strength to the device noise. In one example, the SNR value corresponding to the MCS index value may be determined from mapping data stored in a datastore associated with device 100. Example datastore may be an internal memory of device 100 or an external memory that can be accessed by device 100. For example, the mapping data may provide a correspondence between a list of SNR values and a list of MCS index values. The mapping data may include an SNR value corresponding to each MCS index value as well as the modulation, coding, and data rate per stream based on a channel width.

Further, device 100 may include control unit 112 to modify the feedback RSSI value upon determining that the SNR value falls below the threshold. In one example, control unit 112 may reduce the feedback RSSI value proportional to the increased device noise to maintain the SNR value greater than or equal to the threshold. Further, the modified feedback RSSI value may be transmitted to access point 102 via transceiver 106.

In one example, access point 102 may receive the modified feedback RSSI value and transmit the signal at a second transmit power to transceiver 106 based on the modified feedback RSSI value. Example second transmit power may be greater than the first transmit power. Thus, access point 102 may enhance the transmit power based on the modified feedback RSSI value to compensate for the device noise and maintain the SNR value greater than or equal to the threshold.

In one example, the components of device 100 may be implemented in hardware, machine-readable instructions, or a combination thereof. In one example, noise detection unit 108, SNR monitoring unit 110, and control unit 112 may be implemented as engines or modules comprising any combination of hardware and programming to implement the functionalities described herein.

Device 100 may include computer-readable storage medium including (e.g., encoded with) instructions executable by a processor to implement functionalities described herein in relation to FIG. 1. In some examples, the functionalities described herein, in relation to instructions to implement functions of components of device 100, and any additional instructions described herein in relation to the storage medium, may be implemented as engines or modules including any combination of hardware and programming to implement the functionalities of the modules or engines described herein. The functions of components of device 100 may also be implemented by a respective processor. In examples described herein, the processor may include, for example, one processor or multiple processors included in a single device or distributed across multiple devices.

Figure 2A:
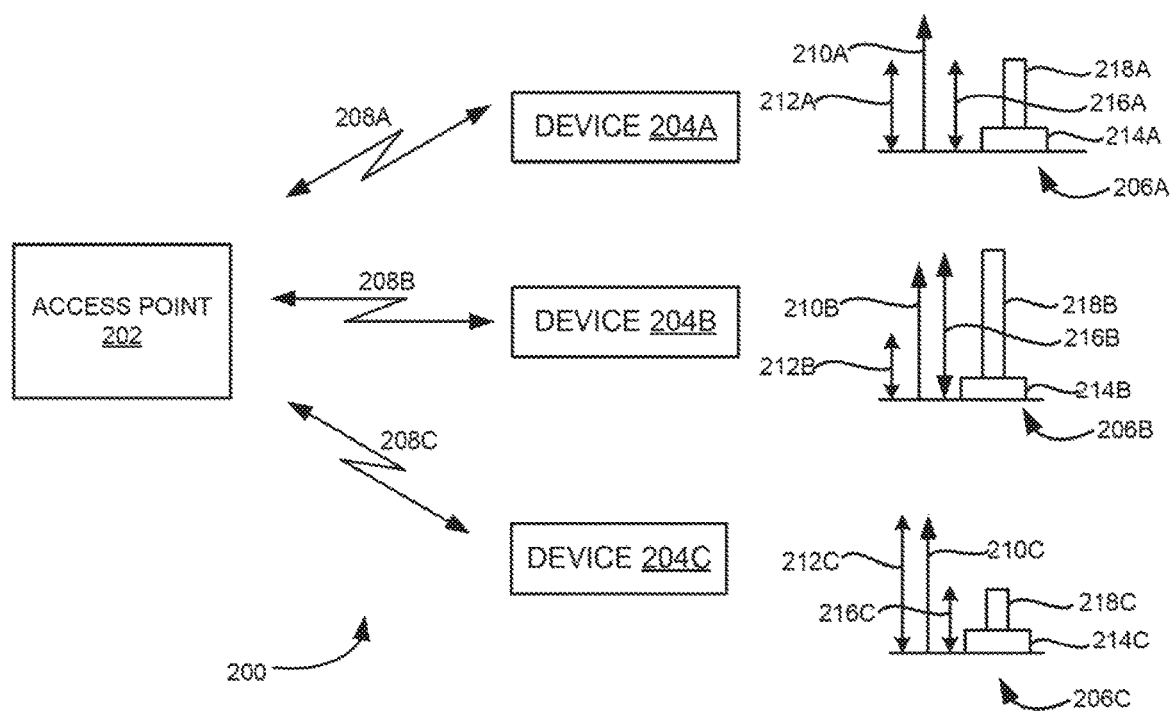
FIG. 2A is a system view of an example computing environment, illustrating an access point to transmit different powers to different devices based on corresponding feedback RSSI values.

FIG. 2A is a system view of an example computing environment 200, illustrating an access point 202 to transmit different powers to different devices 204A-204C based on corresponding feedback RSSI values 212A-212C. In example computing environment 200, multiple Wi-Fi enabled devices (e.g., devices 204A-204C) may be associated with access point 202 through which broader connectivity may be attained with, for example, the Internet.

In one example, devices 204A-204C may receive signals at different transmit power levels 216A-216C from access point 202 via respective wireless network connections 208A-208C, as shown in respective schematic representations 206A-206C. Schematic representations 206A-206C may depict coordinate of power levels 210A-210C, feedback RSSI values 212A-212C, device noise 214A-214C, received transmit power levels 216A-216C, and SNR values 218A-218C. In one example, devices 204A-204C may receive the signals at respective transmit power levels 216A-216C from access point 202 via respective wireless network connections 208A-208C. For example, transmit power levels 216A-216C may be based on feedback. RSSI values 212A-212C.

Figure 2B:
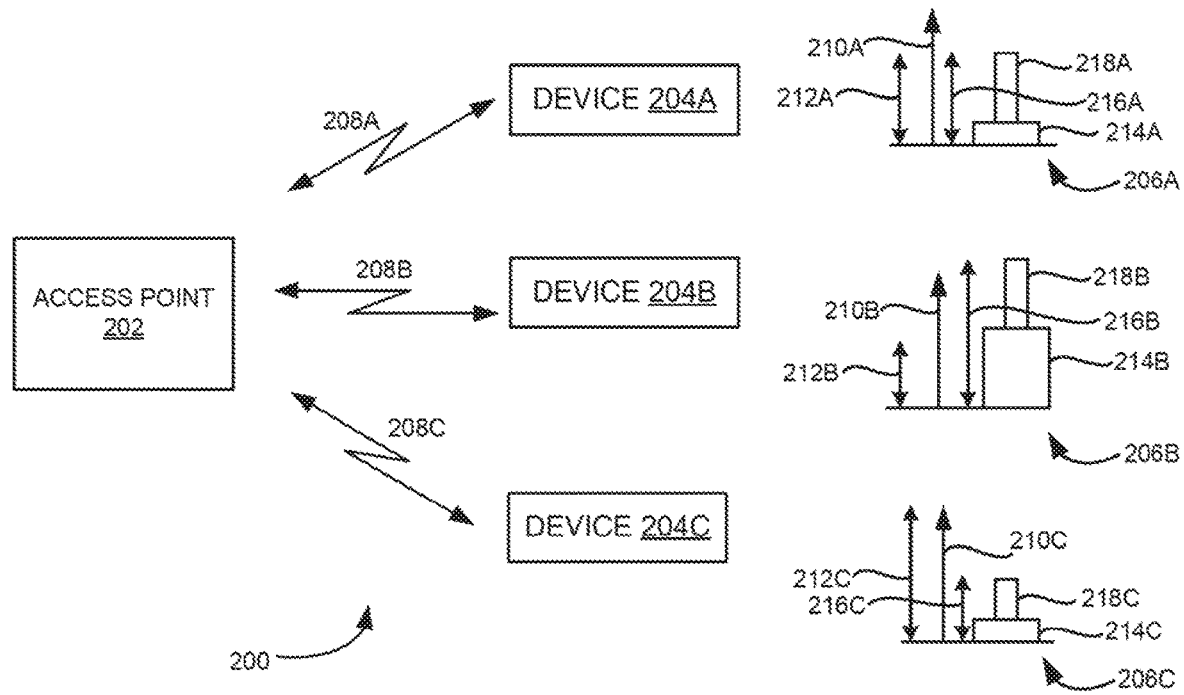
FIG. 2B is a system view of the example computing environment of FIG. 2A, illustrating a reduction in signal-to-noise ratio (SNR) value of a device due to an increase in device noise.

FIG. 2B is a system view of example computing environment 200 of FIG. 2A, illustrating a reduction in SNR value 218B of device 2046 due to an increase in device noise 214B when access point 202 transmits same transmit power level 216B. For example, similarly named elements of FIG. 2B may be similar in structure and/or function to elements described with respect to FIG. 2A. As shown in schematic representations 206A and 206C, there is no change in device noise 214A and 214C and hence no change in the SNR values 218A and 218C.

However, as shown in schematic representation 206B, device noise 214B of FIG. 2B may be increased compared to device noise 214B of FIG. 2A. In this example, SNR value 218B of device 204B may be reduced because of the increase in device noise 214B when the distance between access point 202 and device 204B remains unchanged. In one example, increase in device noise 214B may be determined by analyzing an MCS index value associated with wireless network connection 208B. For example, the MCS index value may be relative to SNR value. Table 1 may depict example MCS index values at an SNR value corresponding to different protocols.

TABLE 1

| Protocol | SNR in dB | 1 | 2 | 3 | 4 | 5 | 6 | 7 | 8 |
|---|---|---|---|---|---|---|---|---|---|
| 1 | 20 MHz | None | None | MCS 0 | MCS 0 | MCS 0 | MCS 2 | MCS 2 | MCS 2 |
| 2 | 20 MHz | None | MCS 0 | MCS 0 | MCS 1 | MCS 2 | MCS 4 | MCS 4 | MCS 4 |

As depicted in Table 1, the MCS index values may be based on factors such as protocols (e.g., protocol 1: 802.11ax) and the SNR values. For example, when the protocol factor is fixed, different MCS index values can be mapped to different SNR values. Further, the signal strength is known and may not be changed as the access point may transmit signal at same power level. In this example, an increase in the device noise can be detected when the MCS index value is reduced. In one example, when the SNR value is lower, the MCS index value may reduce to a lower speed modulation and hence a user may experience a reduced wireless performance. In other words, the MCS index value may be mapped by the SNR value such that the MCS index value may be reacted by device noise difference when the distance between device 204B and access point 202 is not changed. Further, when device noise 214B increases, the MCS index value and modulation may be changed. Based on this condition, the feedback RSSI value 212B may be adjusted to maintain the similar MCS index value as described in FIG. 2C.

Figure 2C:
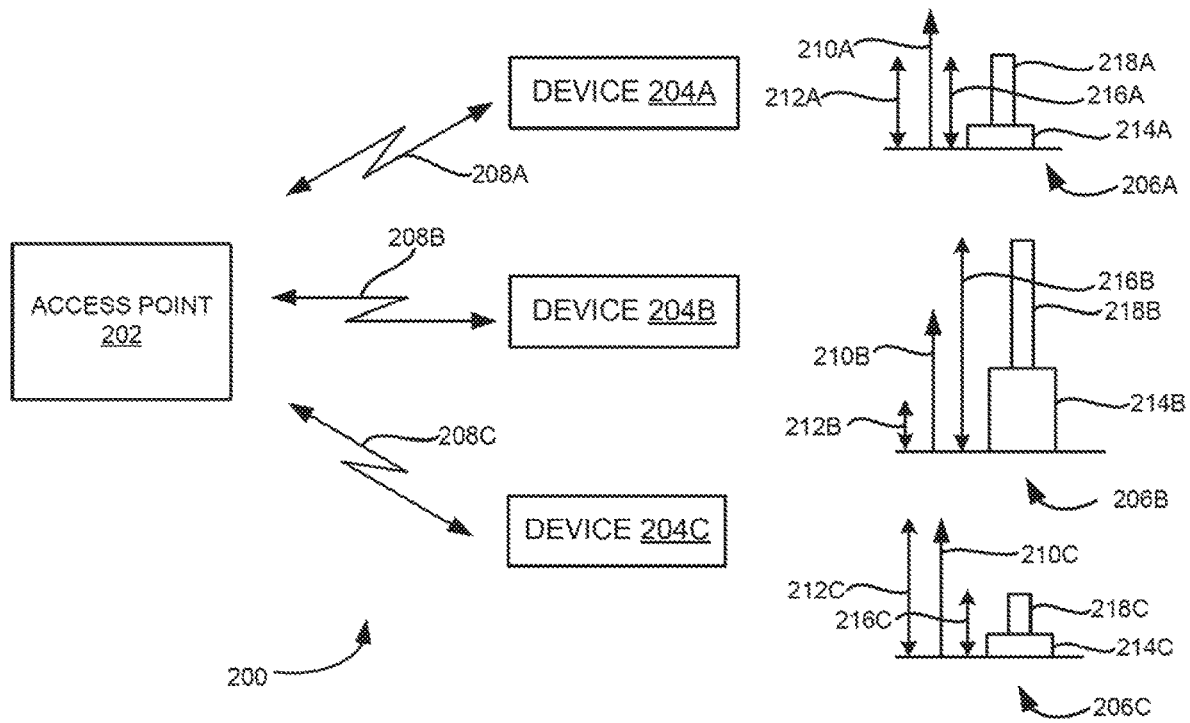
FIG. 2C is a system view of the example computing environment of FIG. 2A, illustrating a reduced feedback RSSI value of the device to maintain the similar SNR value.

FIG. 2C is a system view of the example computing environment 200 of FIG. 2A, illustrating a reduced feedback RSSI value 212B of device 204B to maintain the similar SNR value. For example, similarly named elements of FIG. 2C may be similar in structure and/or function to elements described with respect to FIG. 2A. Since there is no change in device noise 214A and 214C associated with device 204A and device 204C, there is no change in transmit power levels 216A and 216C as shown in schematic representations 206A and 206C.

In schematic representation 206B associated with device 204B, since there is an increase in device noise 214B, it may be determined that SNR value 218B associated with wireless network connection 208B may fall below a threshold due to device noise 214B. Upon determining that SNR value 218B falls below the threshold, feedback RSSI value 212B may be modified. In one example, feedback RSSI value 212B may be reduced proportional to the increase in device noise 214B to maintain SNR value 218B greater than or equal to the threshold. Further, device 204B may transmit reduced feedback RSSI value 212B to access point 202 to receive an enhanced transmit power level 216B as shown in FIG. 2C. Thus, in order to maintain the similar SNR value (e.g., similar to SNR value 218B of FIG. 2A) when device noise 214B is increased, transmit power level 216B may be enhanced by adjusting feedback RSSI 212B, which in turn maintain the MCS at the similar index value.

Figure 3:
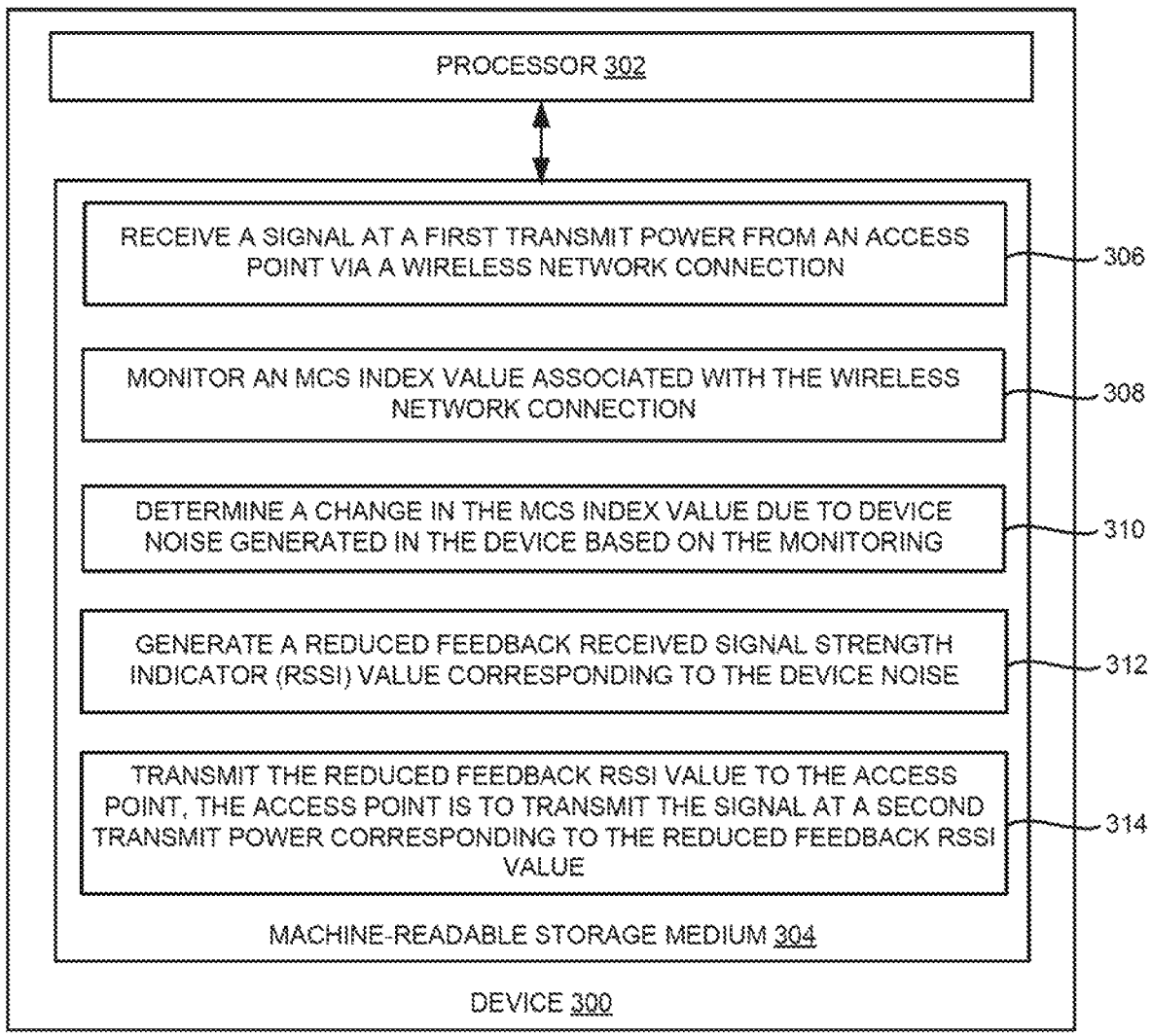
FIG. 3 is a block diagram of an example device including a non-transitory machine-readable storage medium, storing instructions to generate a reduced feedback RSSI value corresponding to device noise.

FIG. 3 is a block diagram of an example device 300 including a non-transitory machine-readable storage medium 304, storing instructions to generate a reduced feedback RSSI value corresponding to device noise. Device 300 (e.g., a wireless client device) may include a processor 302 and machine-readable storage medium 304 communicatively coupled through a system bus. Processor 302 may be any type of central processing unit (CPU), microprocessor, or processing logic that interprets and executes machine-readable instructions stored in machine-readable storage medium 304. Machine-readable storage medium 304 may be a random-access memory (RAM) or another type of dynamic storage device that may store information and machine-readable instructions that may be executed by processor 302. For example, machine-readable storage medium 304 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 304 may be a non-transitory machine-readable medium. In an example, machine-readable storage medium 304 may be remote but accessible to device 300.

Machine-readable storage medium 304 may store instructions 306-314. In an example, instructions 306-314 may be executed by processor 302 to generate the reduced feedback RSSI value corresponding to the device noise. Instructions 306 may be executed by processor 302 to receive a signal at a first transmit power from an access point via a wireless network connection. Instructions 308 may be executed by processor 302 to monitor an MCS index value associated with the wireless network connection.

Instructions 310 may be executed by processor 302 to determine a change in the MCS index value due to device noise generated in the device based on the monitoring. In one example, determining the change in the MCS index value due to the device noise may include determining a change in an SNR value associated with the wireless network connection due to the device noise when a distance between the access point and the device remains same. In this example, the MCS index value may correspond to the SNR value.

Instructions 312 may be executed by processor 302 to generate a reduced feedback RSSI value corresponding to the device noise. In one example, determining the change in the MCS index value may include determining that the MCS index value associated with the wireless network connection falls below a threshold due to an increase in the device noise. In this example, generating the reduced feedback RSSI value may include generating the reduced feedback RSSI value proportional to the increase in the device noise to maintain the MCS index value greater than or equal to the threshold.

Further, instructions 314 may be executed by processor 302 to transmit the reduced feedback RSSI value to the access point. In one example, the access point may transmit the signal at second transmit power corresponding to the reduced feedback RSSI value.

In one example, the MCS index value associated with the wireless network connection may be determined as greater than or equal to the threshold due to a reduction in the device noise. Further, an original feedback RSSI value may be transmitted to the access point upon determining that the MCS index value is greater than or equal to the threshold. In this example, the access point may transmit the signal at the first transmit power corresponding to the original feedback RSSI value.

Figure 4:
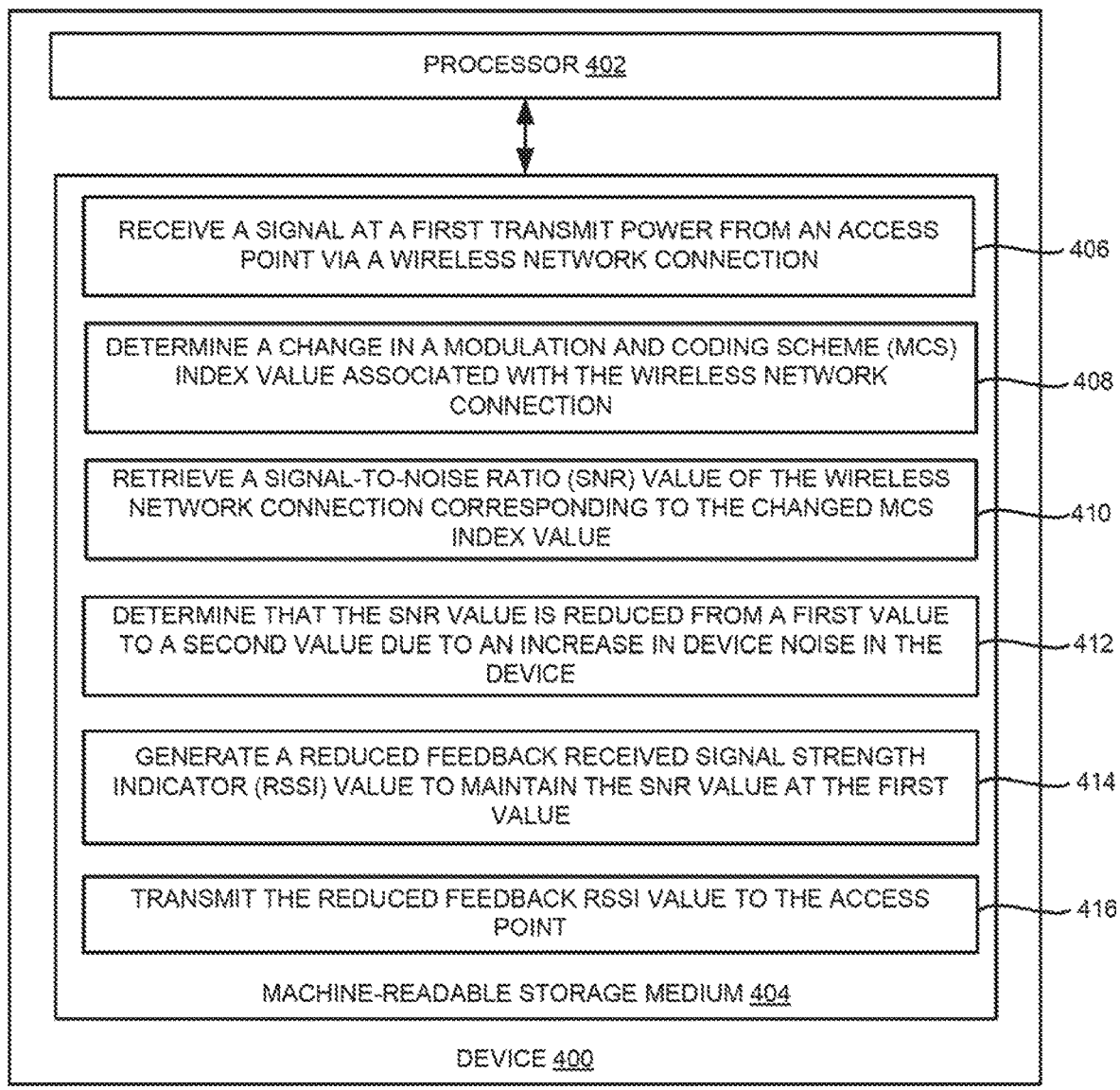
FIG. 4 is a block diagram of another example device including a non-transitory machine-readable storage medium, storing instructions to generate a reduced feedback RSSI value corresponding to device noise.

FIG. 4 is a block diagram of another example device 400 including a non-transitory machine-readable storage medium 404, storing instructions to generate a reduced feedback RSSI value corresponding to device noise. Device 400 (e.g., a wireless client device) may include a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to device 400.

Machine-readable storage medium 404 may store instructions 406-416. In an example, instructions 406 may be executed by processor 402 to receive a signal at a first transmit power from an access point via a wireless network connection. Instructions 408 may be executed by processor 402 to determine a change in an MCS index value associated with the wireless network connection.

Instructions 410 may be executed by processor 402 to retrieve an SNR value of the wireless network connection corresponding to the changed MCS index value. In one example, the SNR value corresponding to the MCS index value may be retrieved from mapping data stored in a datastore associated with the device. For, example, the mapping data may provide a correspondence between a list of SNR values and a list of MCS index values.

Instructions 412 may be executed by processor 402 to determine that the SNR value is reduced from a first value to a second value due to an increase in device noise in the device. In one example, determining that the SNR value is reduced from the first value to the second value due to the increase in the device noise may include determining that the SNR value is reduced from the first value to the second value due to the increase in the device noise while a distance between the access point and the device remains unchanged.

In one example, determining that the SNR value is reduced from the first value to the second value due to the increase in the device noise may include determining that the SNR value is reduced from the first value to the second value due to the increase in the device noise by analyzing mapping data based on a distance between the access point and the device. Example mapping data may provide a correspondence between a list of SNR values and a list of MCS index values.

Instructions 414 may be executed by processor 402 to generate a reduced feedback RSSI value to maintain the SNR value at the first value. Further, instructions 416 may be executed by processor 402 to transmit the reduced feedback RSSI value to the access point. In one example, the access point may receive the reduced feedback RSSI value and transmit the signal at a second transmit power to the device based on the reduced feedback RSSI value. Example second transmit power may be greater than the first transmit power.

Figure 5:
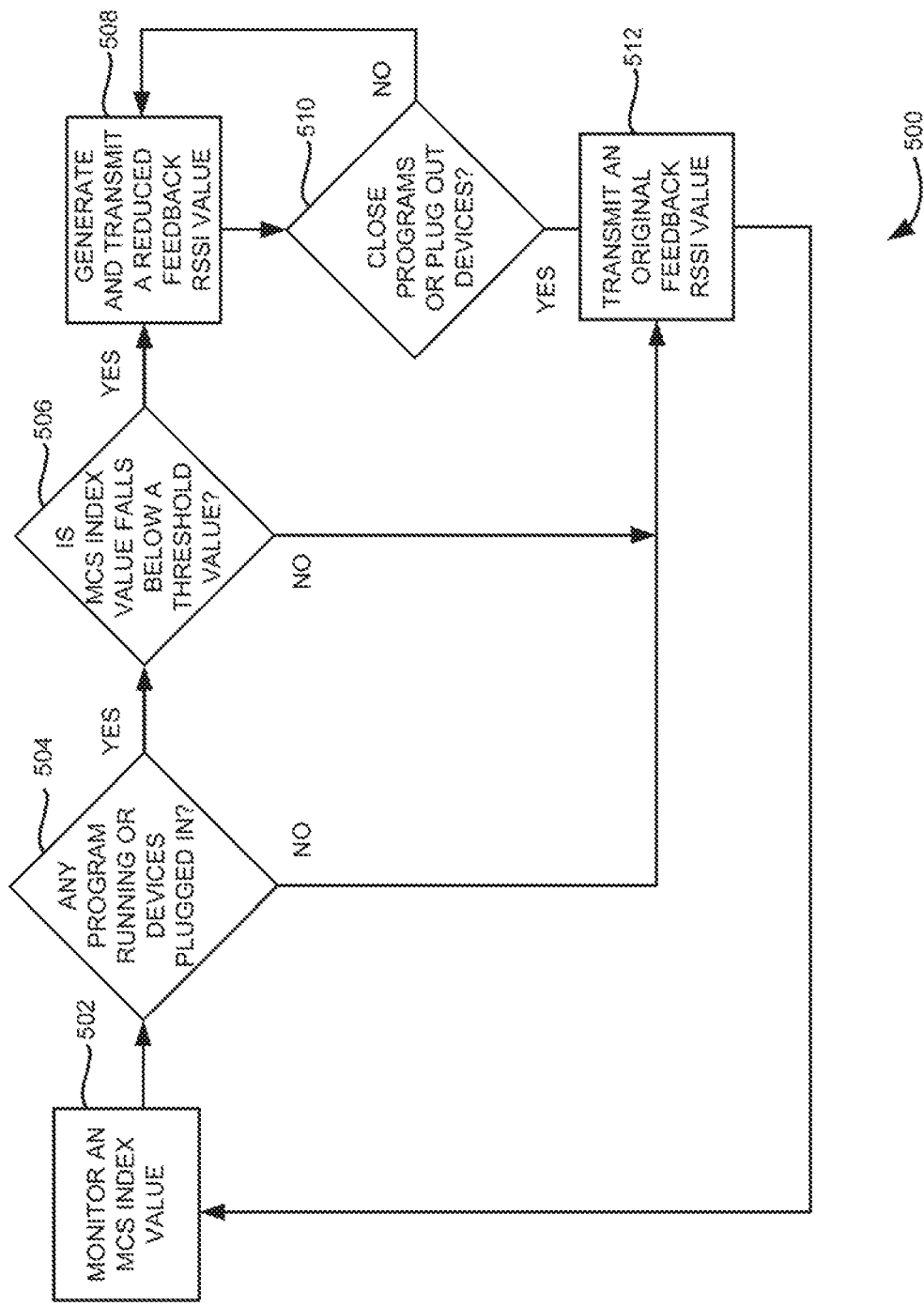
FIG. 5 is an example flow diagram illustrating modifying a feedback RSSI value based on a modulation coding scheme (MCS) index value.

FIG. 5 is an example flow diagram 500 illustrating modifying a feedback RSSI value based on an MCS index value. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. In another implementation, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 502, the MCS index value associated with a wireless network connection between an access point and a device may be monitored. At 504, a check is made to determine whether device noise is generated in the device. For example, a check is made to determine whether the device runs any high loading programs or any external devices plugged-in to the device. When there is no device noise in the device, the process 500 goes to block 512, where an original RSSI value may be transmitted to the access point as feedback.

At 506, when the device noise is determined, a check is made to determine whether the MCS index value falls below a threshold value. When the MCS index value does not fall below the threshold value, the process 500 goes to block 512, where the original RSSI value may be transmitted to the access point as feedback. At 508, when the MCS index value falls below the threshold value, a reduced RSSI value corresponding to the device noise may be generated and the reduced RSSI value may be transmitted to the access point as feedback.

At 510 a check is made to determine whether the device noise is reduced. For example, a check is made to whether the high loading programs are closed or the external devices causing the device noise are plugged-out of the device. When the device noise is not reduced, the reduced RSSI value may be sent to the access point as feedback. At 512, when the device noise is reduced, the original RSSI value may be transmitted to the access point as feedback. Further, the process 500 goes to block 502, where the MCS index value may be monitored.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A device comprising:
a transceiver to receive a signal at a first transmit power from an access point via a wireless network connection, wherein the first transmit power is based on a feedback received signal strength indicator (RSSI) value;
a noise detection unit to determine device noise generated in the device and to determine a change in a modulation and coding scheme (MCS) index value due to the device noise generated in the device;
a signal-to-noise ratio (SNR) monitoring unit to determine that an SNR value associated with the wireless network connection falls below a threshold due to the device noise; and
a control unit to modify the feedback RSSI value upon determining that the SNR value falls below the threshold and transmit the modified feedback RSSI value to the access point via the transceiver.

2. The device of claim 1, wherein the noise detection unit is to determine an increase in the device noise based on the MCS index value associated with the wireless network connection.

3. The device of claim 2, wherein the control unit is to reduce the feedback RSSI value proportional to the increased device noise to maintain the SNR value greater than or equal to the threshold.

4. The device of claim 1, wherein the noise detection unit is to determine the device noise generated in the device during plug-in of an external device or an execution of an application.

5. The device of claim 1, wherein the access point is to receive the modified feedback RSSI value and transmit the signal at a second transmit power to the transceiver based on the modified feedback RSSI value, wherein the second transmit power is greater than the first transmit power.

6. A non-transitory machine-readable storage medium encoded with instructions that, when executed by a device, cause the device to:
receive a signal at a first transmit power from an access point via a wireless network connection;
monitor a modulation and coding scheme (MCS) index value associated with the wireless network connection;
determine a change in the MCS index value due to device noise generated in the device based on the monitoring;
generate a reduced feedback received signal strength indicator (RSSI) value corresponding to the device noise; and
transmit the reduced feedback RSSI value to the access point, wherein the access point is to transmit the signal at a second transmit power corresponding to the reduced feedback RSSI value.

7. The non-transitory machine-readable storage medium of claim 6, wherein instructions to determine the change in the MCS index value comprises instructions to:
determine that the MCS index value associated with the wireless network connection falls below a threshold due to an increase in the device noise.

8. The non-transitory machine-readable storage medium of claim 7, wherein instructions to generate the reduced feedback RSSI value comprises instructions to:
generate the reduced feedback RSSI value proportional to the increase in the device noise to maintain the MCS index value greater than or equal to the threshold.

9. The non-transitory machine-readable storage medium of claim 7, further comprising instructions that, when executed by the device, cause the device to:
determine that the MCS index value associated with the wireless network connection is greater than or equal to the threshold due to a reduction in the device noise; and
transmit an original feedback RSSI value to the access point upon determining that the MCS index value is greater than or equal to the threshold, wherein the access point is to transmit the signal at the first transmit power corresponding to the original feedback RSSI value.

10. The non-transitory machine-readable storage medium of claim 6, wherein instructions to determine the change in the MCS index value due to the device noise comprises instructions to:
determine a change in a signal-to-noise ratio (SNR) value associated with the wireless network connection due to the device noise when a distance between the access point and the device remains same, wherein the MCS index value corresponds to the SNR value.

11. A non-transitory machine-readable storage medium encoded with instructions that, when executed by a device, cause the device to:
receive a signal at a first transmit power from an access point via a wireless network connection;
determine a change in a modulation and coding scheme (MCS) index value associated with the wireless network connection due to device noise generated in the device;
retrieve a signal-to-noise ratio (SNR) value of the wireless network connection corresponding to the changed MCS index value;
determine that the SNR value is reduced from a first value to a second value due to an increase in the device noise in the device;
generate a reduced feedback received signal strength indicator (RSSI) value to maintain the SNR value at the first value; and
transmit the reduced feedback RSSI value to the access point.

12. The non-transitory machine-readable storage medium of claim 11, wherein the access point is to receive the reduced feedback RSSI value and transmit the signal at a second transmit power to the device based on the reduced feedback RSSI value, wherein the second transmit power is greater than the first transmit power.

13. The non-transitory machine-readable storage medium of claim 11, wherein instructions to retrieve the SNR value of the wireless network connection corresponding to the changed MCS index value comprises instructions to:
retrieve the SNR value corresponding to the MCS index value from mapping data stored in a datastore associated with the device, wherein the mapping data is to provide a correspondence between a list of SNR values and a list of MCS index values.

14. The non-transitory machine-readable storage medium of claim 11, wherein instructions to determine that the SNR value is reduced from the first value to the second value due to the increase in the device noise comprises instructions to:
   determine that the SNR value is reduced from the first value to the second value due to the increase in the device noise while a distance between the access point and the device remains unchanged.

15. The non-transitory machine-readable storage medium of claim 11, wherein instructions to determine that the SNR value is reduced from the first value to the second value due to the increase in the device noise comprises instructions to:
   determine that the SNR value is reduced from the first value to the second value due to the increase in the device noise by analyzing mapping data based on a distance between the access point and the device, wherein the mapping data is to provide a correspondence between a list of SNR values and a list of MCS index values.

* * * * *